United States Patent
Hiraya et al.

(10) Patent No.: US 6,672,276 B2
(45) Date of Patent: Jan. 6, 2004

(54) DIRECT FUEL INJECTION ENGINE

(75) Inventors: Koji Hiraya, Yokohama (JP);
Tomonori Urushihara, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/327,924

(22) Filed: Dec. 26, 2002

(65) Prior Publication Data
US 2003/0127068 A1 Jul. 10, 2003

(30) Foreign Application Priority Data
Jan. 9, 2002 (JP) .................................. 2002-002454

(51) Int. Cl.⁷ .............................. F02F 3/26; F02B 17/00
(52) U.S. Cl. ..................... 123/276; 123/298; 123/305
(58) Field of Search .................... 123/276, 279, 123/285, 193.6, 298, 301, 305, 307, 309; 239/533.12

(56) References Cited

U.S. PATENT DOCUMENTS

| | | | |
|---|---|---|---|
| 5,170,758 A | * 12/1992 | Chmela | 123/276 |
| 5,373,820 A | * 12/1994 | Sakamoto et al. | 123/295 |
| 5,960,766 A | * 10/1999 | Hellmich | 123/295 |
| 6,460,509 B1 | 10/2002 | Muramatsu et al. | |
| 6,470,850 B1 | * 10/2002 | Sasaki et al. | 123/305 |
| 6,575,132 B1 | * 6/2003 | Ernst et al. | 123/295 |

FOREIGN PATENT DOCUMENTS

| | | |
|---|---|---|
| JP | 9-158736 A1 | 6/1997 |
| JP | 11-82028 A1 | 3/1999 |
| JP | 2000-227028 A1 | 8/2000 |

* cited by examiner

Primary Examiner—Mahmoud Gimie
Assistant Examiner—Hai H. Huynh
(74) Attorney, Agent, or Firm—Shinjyu Global IP Counselors, LLP.

(57) ABSTRACT

A direct fuel injection engine has a fuel injection valve that injects fuel toward a cavity formed in a top of a piston, and a spark plug that ignites the fuel-air mixture resulting from the fuel injection. The direct fuel injection engine is configured to strengthen the penetration of the fuel streams, to improve the directionality of the fuel streams and to stably form an agglomerate fuel-air mixture close to the spark plug. The cavity preferably has a bottom surface, a curved surface, and a flat surface. In a plan view taken along the center axis of the engine cylinder, cavity C is shaped like an ellipse whose foci are located at the tip of fuel injection valve and the spark discharge gap of spark plug, respectively. The fuel injection valve has a plurality of injection vents that spray solid-core fuel streams.

17 Claims, 11 Drawing Sheets

DIRECT FUEL INJECTION ENGINE

BACKGROUND OF THE INVENTION

1. Field of the Invention

The present invention generally relates to a fuel injected internal combustion engine. More specifically, the present invention relates to a fuel injected internal combustion engine with direct fuel injection into the combustion chamber and spark-ignition.

2. Background Information

An example of a fuel injected internal combustion engine with direct fuel injection into the combustion chamber and spark-ignition is disclosed in Japanese Laid-Open Patent Publication No. 2000-227028. In this publication, a fuel injection valve is positioned at the periphery of the combustion chamber and a cavity is formed in the top of the piston. The fuel injection valve injects a relatively thin, roughly fan-shaped stream of fuel toward the cavity and a spark plug ignites the resulting fuel-air mixture.

The cavity has a bottom wall and an opposing side wall. The opposing side wall has a section that, in a plan view, forms a portion of an ellipse whose foci are located at the injection vent of the fuel injection valve and close to the spark plug, respectively. The shape of the cavity causes the roughly fan-shaped fuel to first follow the bottom wall as it spreads and then follow the opposing wall such that it converges in the vicinity of the spark plug. Thus, a fuel-air mixture field is formed close to the spark plug.

Fuel injection valves are known that have a nozzle portion with an injection vent shaped like a slit. This type of fuel injection valve injects fuel in the shape of a relatively thin fan. The fuel stream from this slit-type injection valve generally has strong penetration. Thus, a fuel-air mixture field can be formed using the motion of the fuel stream alone, i.e., it is not necessary to utilize the gas flow inside the cylinder to form the fuel-air mixture field.

In view of the above, it will be apparent to those skilled in the art from this disclosure that there exists a need for an improved fuel injected internal combustion engine with direct fuel injection into the combustion chamber and spark-ignition. This invention addresses this need in the art as well as other needs, which will become apparent to those skilled in the art from this disclosure.

SUMMARY OF THE INVENTION

It has been discovered that the fuel stream sprayed from such a slit-type injection valve is relatively easily affected by the flow of gases inside the cylinder. The reason the fuel stream is easily affected by the flow of gas inside the cylinder in spite of its strong penetration is believed to be that the fuel stream divides the space surrounding the fuel stream horizontally into upper and lower sections and the pressure difference between the upper and lower sections of space (the pressure changes in various ways due to the flow of gases inside the cylinder) greatly affects the fuel stream.

Since it is normal for the flow of gases inside the cylinder to be different for each cycle, the relationship between the fuel stream and the cavity changes each cycle and there is the possibility that the position and size of the fuel-air mixture field will be unstable. One object of the present invention is to resolve this issue.

The forgoing object of the present invention can basically be attained by providing a direct fuel injection engine comprising a combustion chamber, a spark plug and a fuel injection valve. The combustion chamber has a piston movably mounted therein. The piston includes an upper wall having a cavity with a fuel stream directing surface. The spark plug has a spark discharge gap arranged to ignite a fuel-air mixture in the combustion chamber. The fuel injection valve includes a front edge portion with a plurality of injection vents arranged and configured to directly inject fuel into the combustion chamber against the fuel stream directing surface as plurality of solid-core fuel streams that strike at non-perpendicular angles. The fuel stream directing surface is at least partially curved to direct movement of the fuel streams after striking the fuel stream directing surface toward the fuel injection valve. The fuel stream directing surface is partially elliptical in a top plan view with its focal points being located at the front edge portion of the fuel injection valve and at the spark discharge gap of the spark plug as its focal points.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
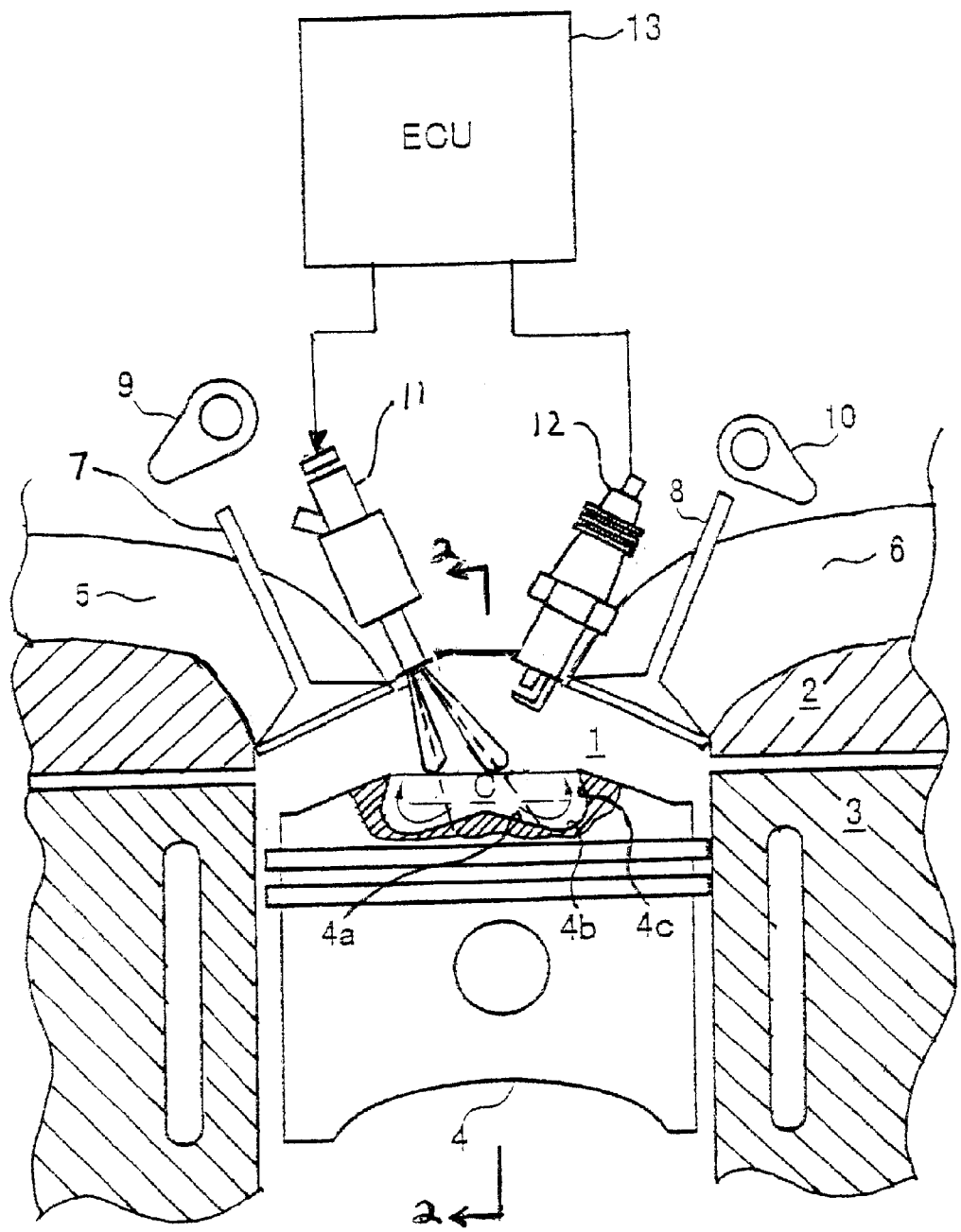
FIG. 1 is a diagrammatic partial cross-sectional view of a fuel injection portion for a direct fuel injection engine in accordance with a first embodiment of the present invention.

Referring initially to FIG. 1, a fuel injection portion of a direct fuel injection engine is schematically illustrated in accordance with a first embodiment of the present invention. Basically, the fuel injection portion of the direct fuel injection engine of the first embodiment of the present invention includes the combustion chamber 1, a cylinder head 2, a cylinder block 3 and a piston 4. The cylinder head 2 is provided with an intake port 5 and an exhaust port 6, both of which open into the combustion chamber 1. An intake valve 7 and an exhaust valve 8 are mounted in the cylinder head 2 and an intake cam 9 and an exhaust cam 10 are provided to control the opening and closing of the valves 7 and 8 in a conventional manner.

Figure 2:
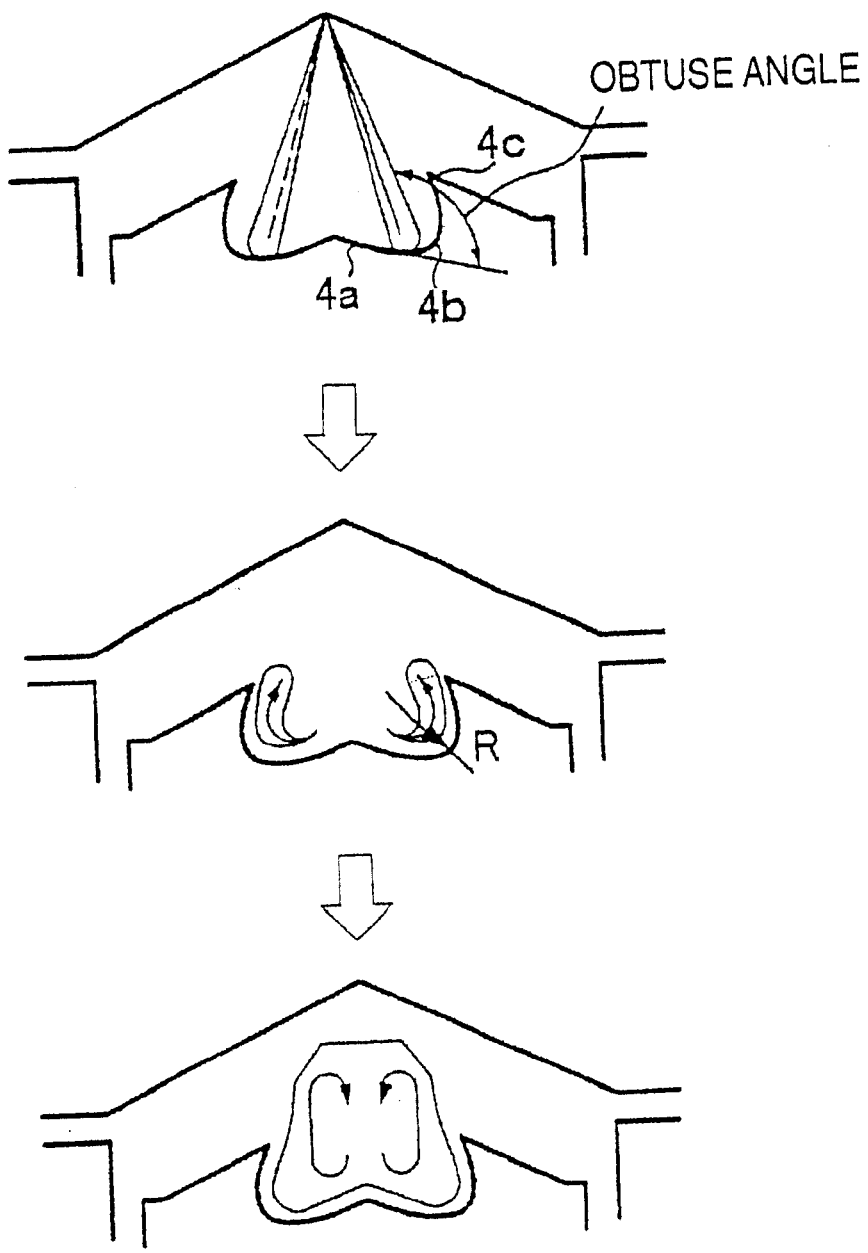
FIG. 2 is a transverse sequential schematic illustration, as seen along section line 2—2 of FIG. 1, of fuel being injected into the cavity of the top surface of the piston to show the behavior of the injected fuel stream in the direct fuel injection engine illustrated in FIG. 1 in accordance with the first embodiment of the present invention.
Figure 3:
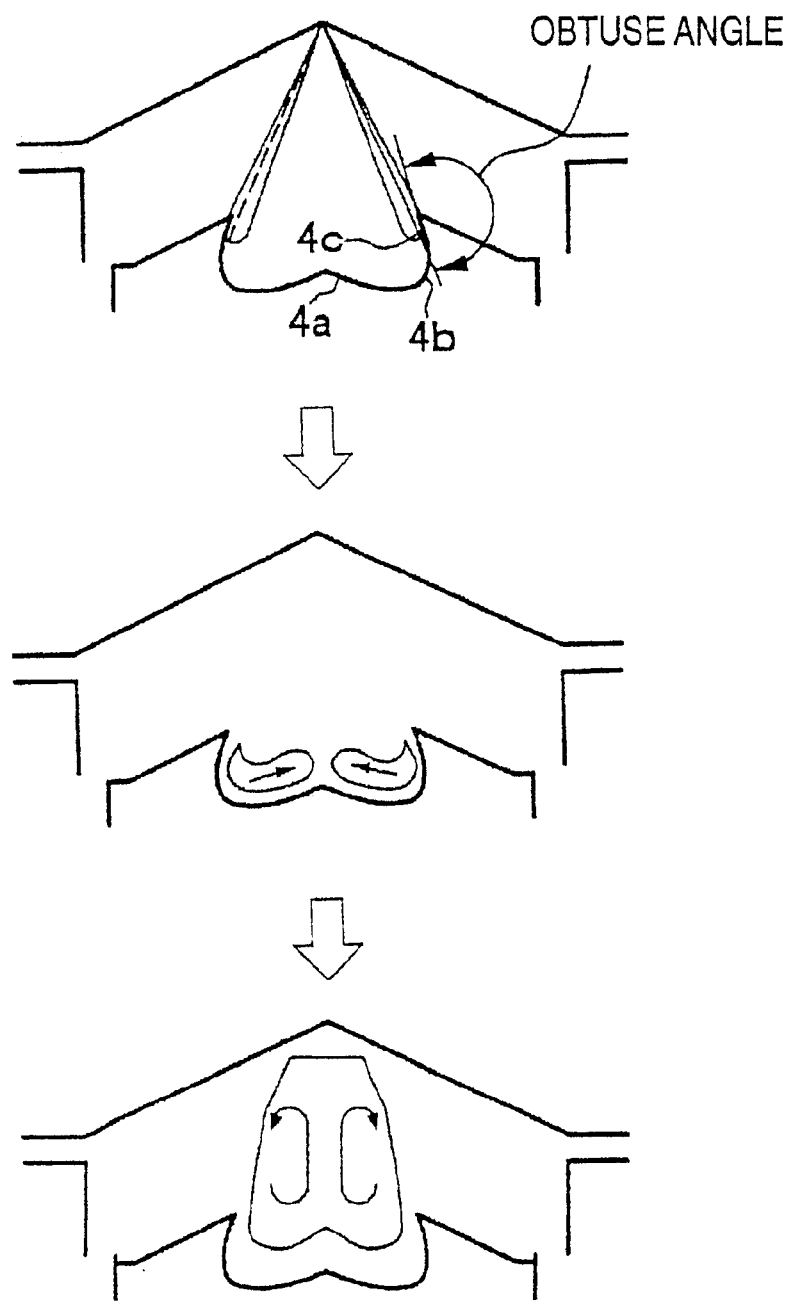
FIG. 3 is a sequential schematic illustration, similar to FIG. 2, of fuel being injected into the cavity of the top surface of the piston to show the behavior of the injected fuel stream in the direct fuel injection engine at a different fuel injection timing than that illustrated in FIG. 2.

The fuel injection portion of the direct fuel injection engine of the first embodiment of the present invention further includes a fuel injection valve 11 and a spark plug 12 arranged in the center portion of the cylinder head 2 such that they face the inside of the combustion chamber 1. The present invention makes it possible to obtain fuel streams having optimum shapes when the fuel injection valve 11 is installed close to the center of the engine cylinder as seen in FIGS. 1–3. Also, by installing the fuel injection valve 11 close to the center of the engine cylinder, the shape of the piston cavity and the shape of the entire combustion chamber 1 can be made substantially symmetrical about the center axis of the fuel injection valve 11 and the flame propagation at the point in time when the S/V ratio is minimum and the combustion is homogeneous can be made symmetrical. Consequently, an engine can be obtained which has no spikes in its anti-knocking performance, i.e., no spikes in its output and fuel consumption.

The fuel injection valve 11 and the spark plug 12 are conventional components that are well known in the art. Since fuel injection valves and spark plugs are well known in the art, these structures will not be discussed or illustrated in detail herein. An engine control unit 13 controls the operations of the fuel injection valve 11 and the spark plug 12 in a conventional manner.

The engine control unit 13 preferably includes a microcomputer with a direct fuel injection control program that controls fuel injection portion of the direct fuel injection engine in a conventional manner. The engine control unit 13 can also include other conventional components such as an input interface circuit, an output interface circuit, and storage devices such as a ROM (Read Only Memory) device and a RAM (Random Access Memory) device. The engine control unit 13 is a conventional component that is well known in the art. Since engine control units are well known in the art, the particulars of the engine control unit 13 will not be discussed or illustrated in detail herein.

The fuel injection valve 11 injects the fuel at a fuel injection pressure of at least 20 MPa. Thus, fuel streams with small particle sizes, i.e., fuel streams that do not generate smoke, can be formed even when using a hole nozzle for the fuel injection valve 11, which sometimes causes the particle size of the injected fuel to become large if the fuel injection pressure is low.

A recessed cavity C is formed in the top face or upper wall of the piston 4. The cavity C has an elliptical opening with a fuel stream directing surface having a first or bottom wall surface 4a, a second or curved wall surface 4b and a third or flat wall surface 4c. The elliptically shaped cavity C has the overall shape of an ellipse whose foci are located at the fuel injection valve 11 (i.e., the tip thereof) and at the spark plug 12 (i.e., the spark discharge gap thereof) as seen in FIG. 1. The elliptically shaped cavity C is useful when restrictions on the engine layout prohibit positioning the fuel injection valve 11 and the spark plug 12 very close to each other. By using a fuel stream directing surface having the shape of an ellipse whose foci are located at the tip of the fuel injection valve 11 and at the spark discharge gap of the spark plug 12, the present invention makes it possible for the injected fuel to form a laminar fuel-air mixture centering on the spark plug 12, and thus, achieves a stable, laminar spark ignited combustion.

The fuel from the fuel injection valve 11 is directly injected into the combustion chamber 1 against the fuel stream directing surface as a plurality of solid-core fuel streams that strike at non-perpendicular angles. In particular, the fuel injection valve 11 has a front edge portion with a plurality of injection vents 11a arranged and configured to directly inject fuel into the combustion chamber 1 against the fuel stream directing surface. Each of the injection vents 11a includes a center spraying axis and a predetermined spraying angle. The solid-core fuel streams as used herein refers to an elongated bar shaped stream of atomized fuel that does not include a center hollow core that is substantially free of atomized fuel. The term elongated as used herein means a fuel stream that is longer in the injection direction of than in width (perpendicular injection direction).

It will be apparent to those skilled in the art from this disclosure that the precise shape of the fuel stream directing surface of the cavity C depends upon the various dimensional relationships and constructions of the parts (e.g., the combustion chamber 1, the piston 4, the fuel injection valve 11 and the spark plug 12) of the fuel injection engine. Thus, the shape of the fuel stream directing surface of the cavity C is provided for illustration only and not for the purpose of limiting the invention as defined by the appended claims.

The bottom wall surface 4a is preferably an elliptically shaped conical surface with its apex positioned at a center point of the ellipse, e.g., at the center of the piston 4 which is also midway between the fuel injection valve 11 and the spark plug 12. The bottom wall surface 4a slants slightly downward as it moves outwardly away from the center of the ellipse. The curved wall surface 4b is annular curved surface that joins the outer edge of the bottom wall surface 4a to the inner edge of the wall surface 4c. The curved wall surface 4b has a predetermined radius of curvature that directs the fuel streams hitting the upper wall of the piston 4 upwardly towards the vicinity of the tip of the spark plug 12. The flat wall surface 4c is an annular conical surface that extends directly from the outer annular edge of the curved wall surface 4b. The flat wall surface 4c points generally toward the vicinity of the tip of the spark plug 12. In the illustrated embodiment, the center of the elliptically shaped cavity C is offset from the fuel injection valve 11, thus the transverse cross-section is preferably non-uniform so that the fuel streams hitting the upper wall of the piston 4 is directed upwardly towards the vicinity of the tip of the spark plug 12.

Of course, it will be apparent to those skilled in the art from this disclosure that the transverse cross-section of the cavity C can vary at different areas depending upon the various dimensional relationships of the parts (e.g., the combustion chamber 1, the piston 4, the fuel injection valve 11 and the spark plug 12) of the fuel injection engine.

Referring now to FIG. 2, the general relationship between the shape of the cavity C and the behavior of the fuel streams that are injected from the fuel injection valve 11 into the combustion chamber 1 is illustrated at a first fuel injection timing. At this first fuel injection timing, fuel streams first strike or hit the bottom wall surface 4a of the cavity C. The angle of the bottom wall surface 4a is configured such that the angle formed between a line corresponding to the direction in which the fuel streams were injected and the portion of the cavity wall where the fuel stream proceeds after hitting the bottom wall surface 4a is an obtuse angle. After hitting the bottom wall surface 4a, the fuel streams are guided by the curved wall surface 4b (second wall surface) and the flat wall surface 4c (third wall surface) toward the vicinity of the tip of the fuel injection valve 11. The curved wall surface 4b and the flat wall surface 4c cause the velocity of the fuel streams in the injection direction to be converted to the direction from which the fuel was injected and, as a result, a rotating swirl-like flow velocity is imparted to the fuel streams. The rotating flow velocity pulls in air from the surrounding areas and the fuel-air mixture formed above the cavity C is homogeneous and free of concentration variations. Although not shown in the drawings, the effects of the present invention can also be obtained by eliminating the flat wall surface 4c and configuring the curved wall surface 4b such that its free end face points toward the tip of the fuel injection valve 11.

Referring now to FIG. 3, the relationship between the shape of the cavity C and the behavior of the fuel streams that are injected from the fuel injection valve 11 into the combustion chamber 1 is illustrated at a second fuel injection timing in which the fuel streams strike the flat wall surface 4c of the cavity C.

When the fuel injection timing is relatively early as seen in FIG. 3, the fuel streams initially strike the cavity C at the flat wall surface 4c (here, this wall surface becomes the first wall surface) at an obtuse angle. Then the fuel streams are guided by the curved wall surface 4b (second wall surface) and the bottom wall surface 4a (there is no third wall surface in this case). The bottom wall surface 4a rises toward the center because it is configured such that the fuel streams will hit it at an obtuse angle in the case shown in FIG. 2. Consequently, after being guided from the flat wall surface 4c by the curved wall surface 4b, the fuel streams are directed above the cavity C and forms a circulating region. As a result, the fuel-air mixture formed above the cavity C is homogeneous and free of concentration variations. Thus, by using a cavity shaped like that of the present embodiment, a homogeneous fuel-air mixture can be formed regardless of the ignition timing and stable laminar combustion can be achieved regardless of the engine speed and load.

Figure 4:
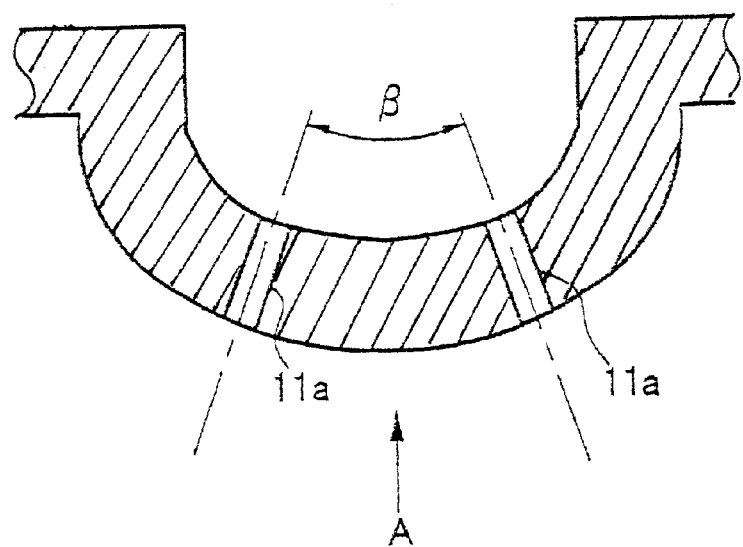
FIG. 4 is a diagrammatic vertical cross sectional view of the tip section of the fuel injection valve of the direct fuel injection engine illustrated in FIG. 1 as viewed along section line 4—4 of FIG. 5.
Figure 5:
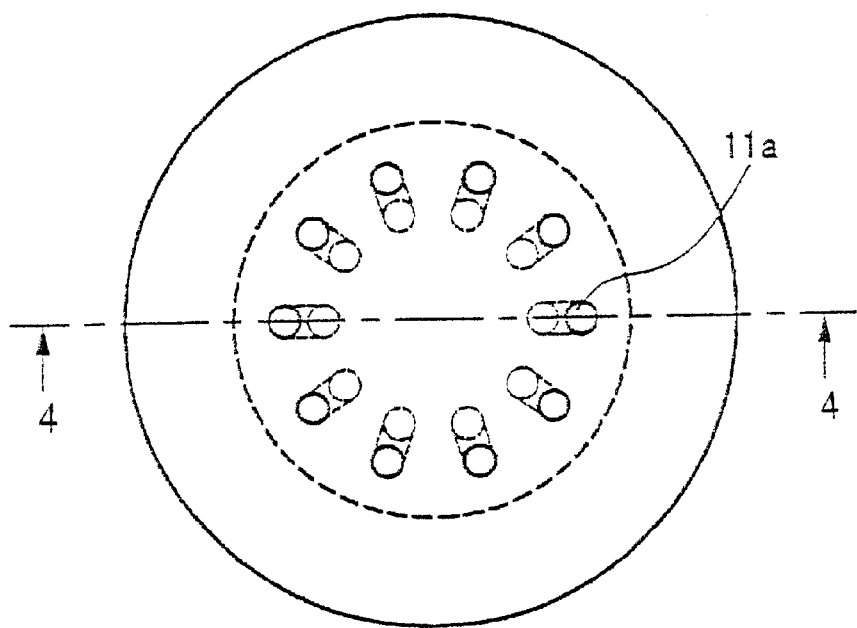
FIG. 5 is a diagrammatic bottom plan view of the tip section of the fuel injection valve of the direct fuel injection engine illustrated in FIG. 1 as viewed along the direction of arrow A of FIG. 4.
Figure 6:
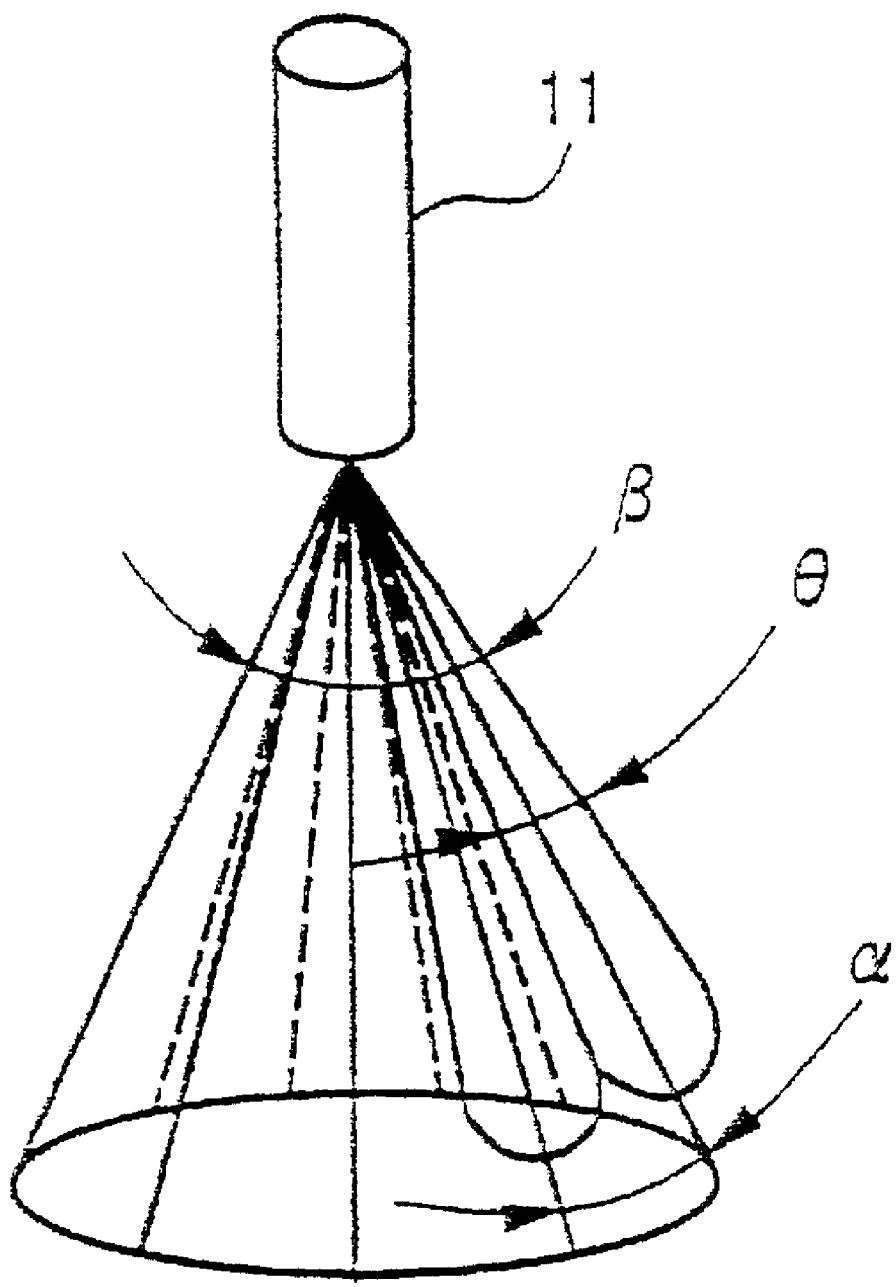
FIG. 6 is a diagrammatic illustration of the shape of the fuel streams from the fuel injection valve of the direct fuel injection engine illustrated in FIG. 1 in accordance with the first embodiment of the present invention.

Referring now to FIGS. 4 and 5, the tip of the fuel injection valve 11 will now be explained. FIG. 4 is a vertical cross sectional view (taken along line 4—4 of FIG. 5) of the tip of the fuel injection valve 11, while FIG. 5 is a bottom plan view as viewed along the direction of arrow A of FIG. 4. The fuel injection valve 11 is a hole nozzle that has a plurality of the injection vents 11a arranged around the center axis of the fuel injection valve 11 with equal angular spacing therebetween. Each of the injection vent 11a has a circular cross section with a prescribed diameter and the center axis of each injection vent 11a points diagonally outward such that all of the injection vents 11a have their center axes forming the vertex angle β of a circular cone, as shown in FIG. 4. The shape of the fuel streams are shown in FIG. 6. The injection vents 11a of the fuel injection valve 11 each form a fuel stream having a solid circular cone shape that is close to being rod-shaped. Thus, the injection vents 11a are arranged and configured to directly inject fuel into the combustion chamber 1 against the fuel stream directing surface as plurality of elongated solid-core fuel streams that strike at non-perpendicular angles. Together the plurality of streams injected from injection vents 11a form a combined fuel stream having the shape of a hollow circular cone.

The separation angle α formed between adjacent center axes of the injection vents 11a is less than or equal to the spread or spraying angle θ of the fuel streams sprayed from a single one of the injection vent 11a. In other words, the adjacent pairs of the injection vents 11a are arranged such that the center spraying axes form predetermined separation angles a between adjacent pairs of the solid-core fuel streams that are equal to or smaller than the spraying angles α of the injection vents 11a. For example, according to Hiroyasu et al. (Journal of the Japan Society of Mechanical Engineers (Section 2), 621.436.013.4), the spread or spray angle θ of the fuel streams sprayed from a hole nozzle injection valve is approximately 20 degrees. Therefore, if the number of injection vents is 10 and the vertex angle (angle β in FIG. 4) of the combined fuel streams is set to approximately 60 degrees, then the angle between adjacent individual fuel streams will be approximately 18 degrees and adjacent individual fuel streams will overlap.

By configuring the fuel injection valve 11 such that each individual fuel stream is a solid-core fuel stream as described here, strong penetration can be obtained, the directionality can be increased, and the effects of gas flows inside the cylinder can be reduced. Consequently, the shape of the fuel streams do not change due to back pressure and the relationship between the cavity C and the fuel streams can be stabilized. Thus, a fuel stream having strong directionality and a stable shape can be formed even under the high back pressure conditions that exist during the latter half of the compression stroke.

Additionally, since the separation angle α between adjacent injection vents 11a is set such that adjacent fuel streams touch or partially overlap each other, the plurality of individual fuel streams form a combined fuel stream having a prescribed shape and the combined fuel stream is free of gaps and has little variation in fuel distribution on the inside thereof. Therefore, it is possible to form a single agglomerate fuel-air mixture field that is stable and homogeneous and has uniform concentration.

Figure 7:
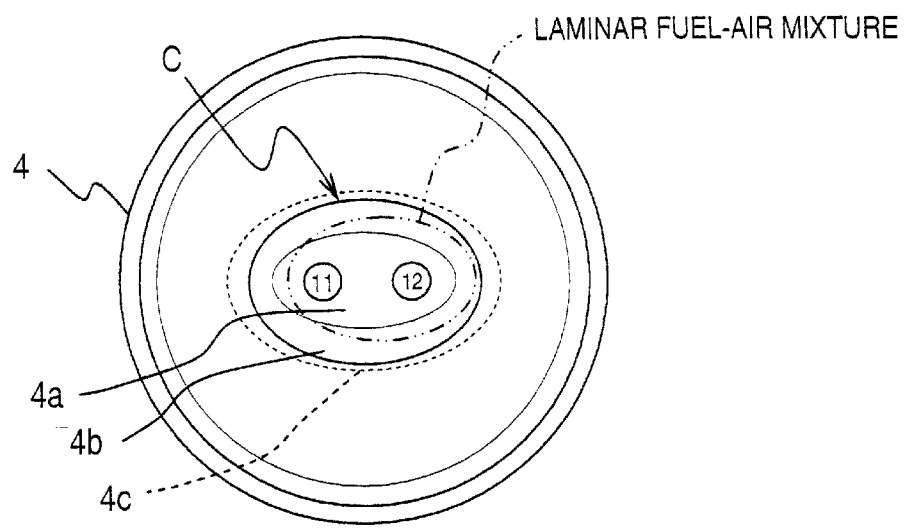
FIG. 7 is a top diagrammatic plan view of the shape of the elliptically cavity formed in the top surface of the piston of the direct fuel injection engine illustrated in FIG. 1 of the first embodiment, when viewed from above the piston.
Figure 8:
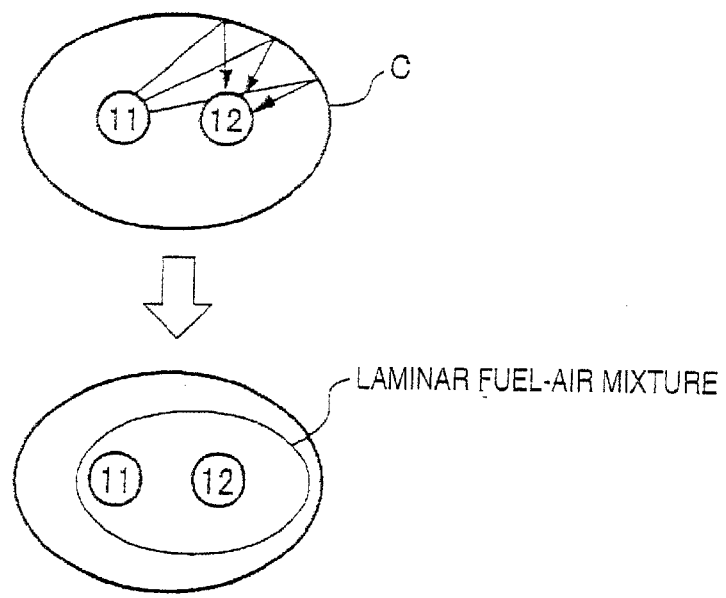
FIG. 8 is a schematic illustration showing the fuel streams from the fuel injection valve relative to the spark plug and the fuel injection valve for the elliptically shaped cavity formed in the top surface of the piston of the direct fuel injection engine illustrated in FIG. 1 of the first embodiment, when viewed from above the piston.
Figure 9:
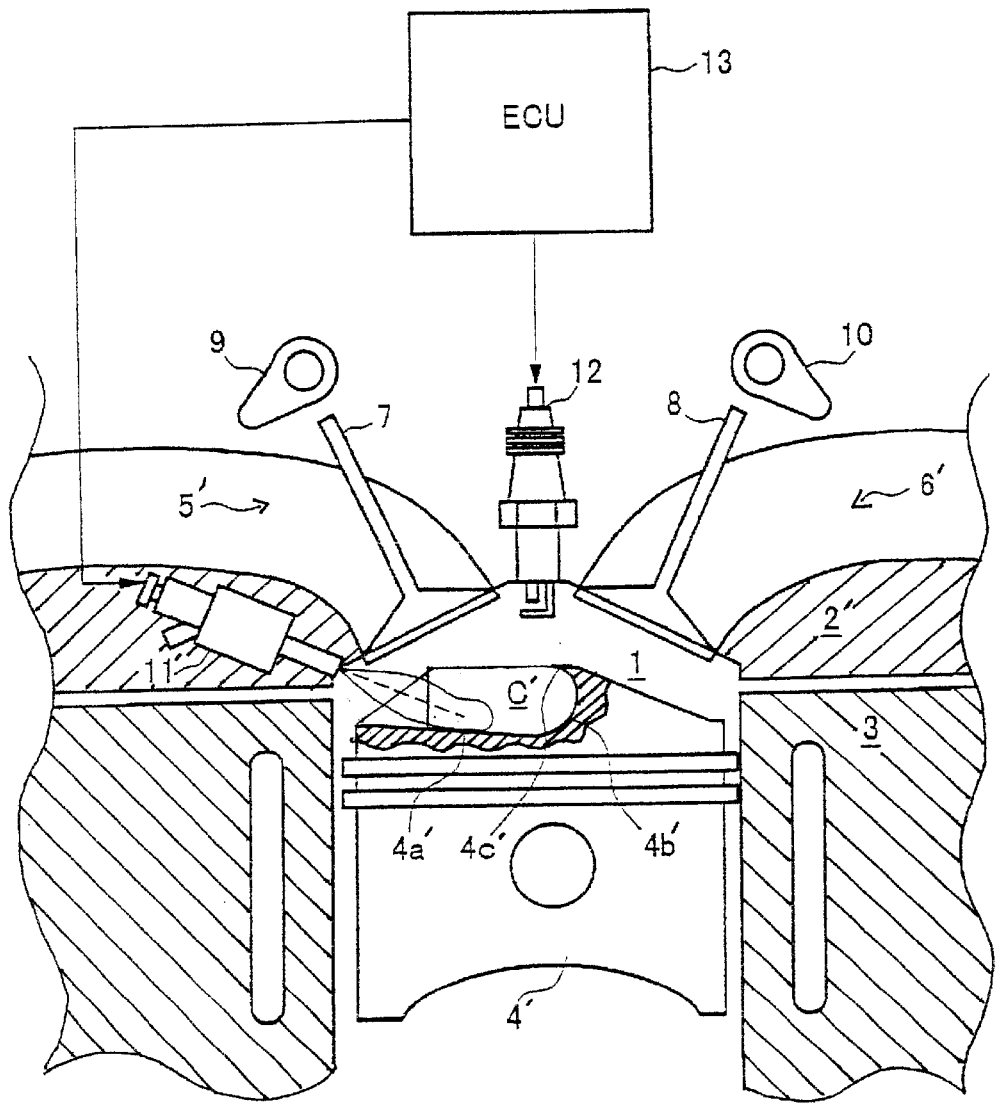
FIG. 9 is a schematic view of a fuel injection portion of a direct fuel injection engine in accordance with a second embodiment of the present invention.

FIGS. 7 and 8 show the shape of the piston cavity C when viewed from above the combustion chamber 1. The cavity C has the shape of an ellipse whose foci are located at fuel injection valve 11 (i.e., the tip thereof) and at spark plug 12 (i.e., the spark discharge gap thereof). As shown in FIG. 2, the shape of the cavity C causes the fuel streams injected from the fuel injection valve 11 to form a circulating region, and thus, to form a uniform laminar fuel-air mixture. Since the spark plug 12 is located at a focus of the ellipse, the injected fuel streams gather in the vicinity of the spark plug 12 due to the shape of the cavity and the laminar fuel-air mixture is centered on the spark plug 12. Thus it is possible to form a stable, single-agglomerate fuel-air mixture field in the vicinity of the spark plug and to achieve stable, spark-ignited laminar combustion.

Second Embodiment

Referring now to FIGS. 9–16, a schematic view of a direct fuel injection engine invention will be described in accordance with a second embodiment of the present invention. In view of the similarity between the first and second embodiments, the parts of the second embodiment that are identical to the parts of the first embodiment will be given the same reference numerals as the parts of the first embodiment. On the other hand, the parts of the second embodiment that differ from the parts of the first embodiment will be indicated with a prime ('). Thus, the descriptions of the parts of the second embodiment that are identical to the parts of the first embodiment may be omitted for the sake of brevity.

Figure 10:
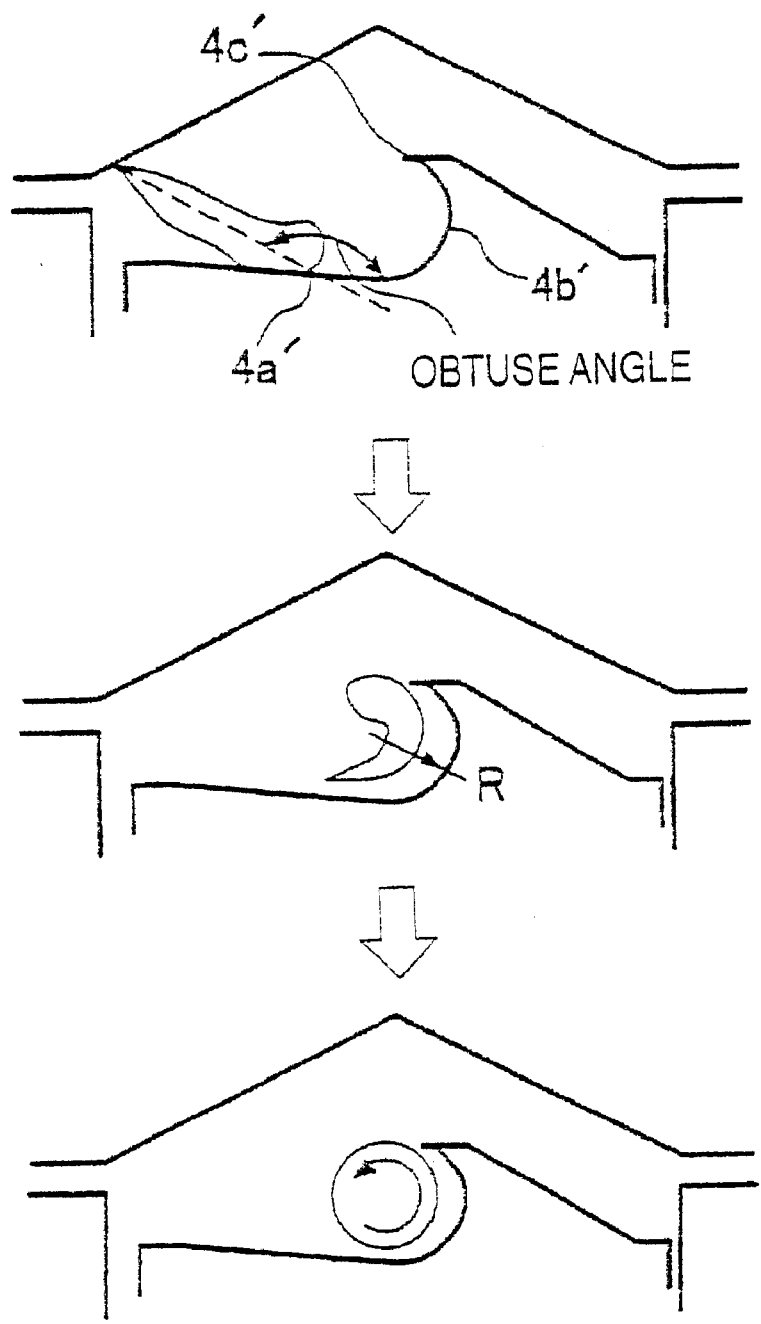
FIG. 10 is a sequential schematic illustration of fuel being injected into the cavity of the top surface of the piston to show the behavior of the injected fuel stream in the direct fuel injection engine illustrated in FIG. 9 in accordance with the second embodiment of the present invention.

Referring now to FIG. 10, the relationship between the shape of the cavity C' and the behavior of the fuel streams that are injected from the fuel injection valve 11' into the combustion chamber 1 is illustrated at a first fuel injection timing in which the fuel streams strike the bottom wall surface 4a' of the cavity C'. Similarly to the first embodiment, the injected fuel is imparted with a flow velocity that rotates in a swirling manner. The rotating flow velocity pulls in air from the surroundings and the fuel-air mixture formed above the cavity C' is homogeneous and free of concentration variations. As a result, a homogeneous fuel-air mixture field can be formed within the cavity because the fuel and air can mix together easily and it is difficult for unevenness of concentration to occur.

Basically, the fuel injection portion of the direct fuel injection engine of the second embodiment of the present invention differs from the first embodiment in that a modified cylinder head 2' and a modified piston 4' are used. In particular, the cylinder head 2' has been modified such that a modified fuel injection valve 11' is positioned to one side the combustion chamber 1 and the spark plug 12' is positioned along the center axis of the combustion chamber 1.

Thus, the direct fuel injection engine of the second embodiment basically includes the combustion chamber 1, the cylinder head 2', the cylinder block 3 and the piston 4'. The cylinder head 2' is provided with an intake port 5' and an exhaust port 6', both of which open into the combustion chamber 1.

In this embodiment, the present invention is applied to an engine in which the fuel injection valve 11' is positioned to the side of the combustion chamber 1 and below the intake port 5'. In particular, the portion of the top or upper wall of the piston 4' on the intake side of the engine is provided with a cavity C'. The cavity C' has a bottom wall surface 4a' (first wall surface), a curved wall surface 4b' (second wall surface) and a flat surface 4c' (third wall surface). The bottom wall surface 4a' is offset from the center of the piston 4' and slants slightly downward as it moves inwardly towards the center of the piston 4'.

The curved wall surface 4b' joins the inner edge of the bottom wall surface 4a' to the inner edge of the wall surface 4c'. The curved wall surface 4b' has a predetermined radius of curvature that directs the fuel hitting the upper wall of the piston 4' upwardly towards the vicinity of the tip of the fuel injection valve 11'. The flat wall surface 4c' joins the curved wall surface 4b' and points substantially toward the direction from which the fuel is injected, e.g., the vicinity of the tip of the fuel injection valve 11'.

Figure 11:
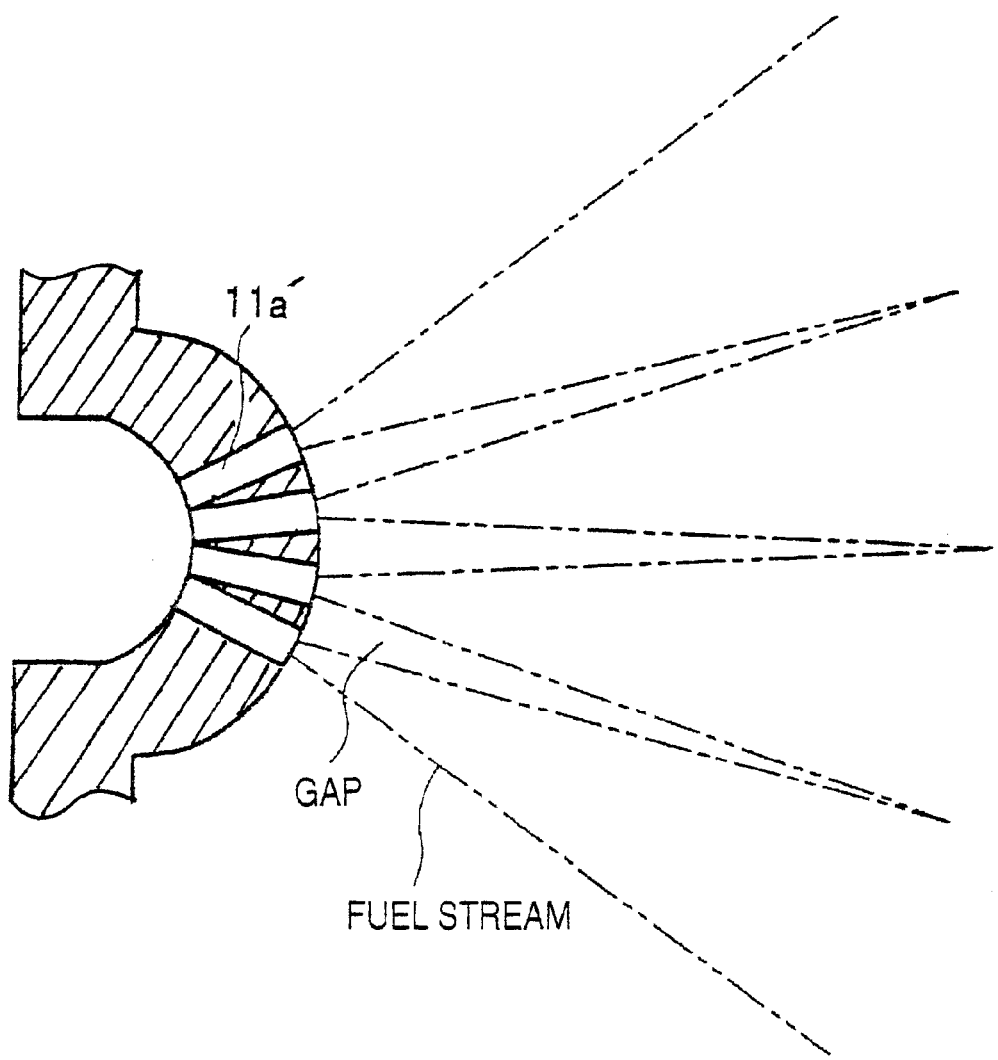
FIG. 11 is a diagrammatic horizontal cross sectional view of the tip section of the fuel injection valve of the direct fuel injection engine illustrated in FIG. 9 in accordance with the second embodiment of the present invention.

FIG. 11 shows a horizontal cross section of the tip part of the fuel injection valve 11' with the fuel streams being sprayed from the fuel injection valve 11', when viewed from above the combustion chamber 1. The fuel injection valve 11' is a hole nozzle provided with a plurality of injection vents 11a' arranged in a radial pattern with an equal angular spacing in a plan view. Each injection vent 11a' has a circular cross section with a prescribed diameter.

Figure 12:
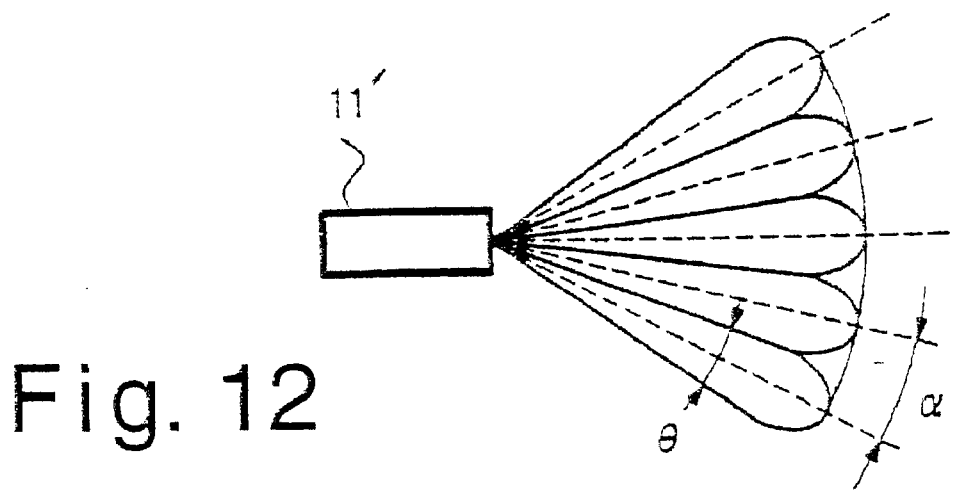
FIG. 12 is a top diagrammatic illustration of the shape of the fuel streams from the fuel injection valve of the direct fuel injection engine illustrated in FIG. 9 in accordance with the second embodiment of the present invention.
Figure 13:
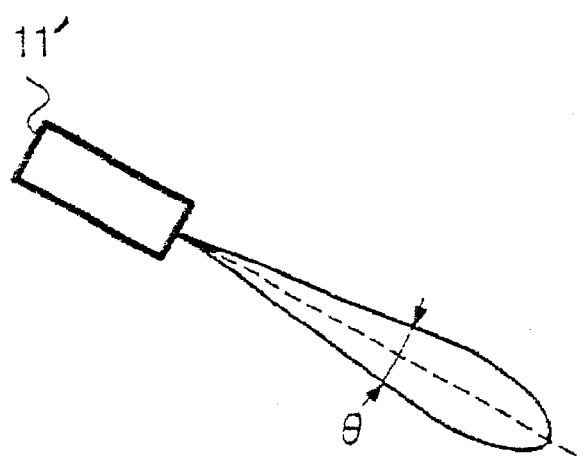
FIG. 13 is a side diagrammatic illustration of the shape of the fuel streams from the fuel injection valve of the direct fuel injection engine illustrated in FIG. 9 in accordance with the second embodiment of the present invention.

FIGS. 12 and 13 show top and side views of the fuel streams from the fuel injection valve 11' in accordance with the second embodiment of the present invention. The fuel streams sprayed by the plurality of injection vents 11a' (arranged in fuel injection valve 11' in a radial pattern with an equal angular spacing) form a combined fuel stream having the shape of a thin fan. The angle α in the figure between adjacent individual fuel streams is set to be less than or equal to the spread angle θ of the fuel stream injected from any single injection vent. As a result, adjacent individual fuel streams overlap each other.

The shape of this combined fuel stream is similar to the shape of the fuel stream produced by a slit-type injection valve. However, as shown in FIG. 11, there are small air gaps between the individual fuel streams, at the area immediately adjacent to the tip of the fuel injection valve 11'. Thus, the combined fuel stream does not completely divide the surrounding space and is not easily affected by the flow of gases inside the cylinder.

Similar to the first embodiment, the fuel injection valve 11' is a hole nozzle and can form a fuel stream having a stable shape and strong directionality, even under the high back pressure conditions that exist during the latter half of the compression stroke. The fuel injection valve 11' is provided with a plurality of injection vents arranged with an equal angular spacing when viewed from above. As a result, a combined fuel stream is formed having a fan, as mentioned above.

The injection vents 11a' of the fuel injection valve 11' each form a fuel stream having a solid circular cone shape that is close to being rod-shaped. Thus, the injection vents 11a' are arranged and configured to directly inject fuel into the combustion chamber 1 against the fuel stream directing surface as plurality of elongated solid-core fuel streams that strike at non-perpendicular angles.

The separation angle α (in FIG. 12) formed between adjacent center axes of the injection vents 11a' is less than or equal to the spread or spraying angle θ (in FIG. 13) of the fuel streams sprayed from a single one of the injection vent 11a'. In other words, the adjacent pairs of the injection vents 11a' are arranged such that the center spraying axes form predetermined separation angles a between adjacent pairs of the solid-core fuel streams that are equal to or smaller than the spraying angles θ of the injection vents 11a'. As a result, adjacent individual fuel streams overlap each other, except for the area immediately adjacent the injection vent 11a' as seen in FIG. 11.

Figure 14:
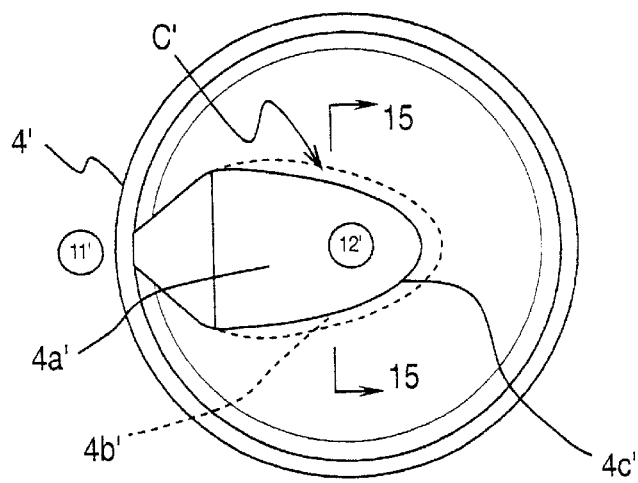
FIG. 14 is a top diagrammatic plan view of the shape of the elliptically cavity formed in the top surface of the piston of the direct fuel injection engine illustrated in FIG. 9 of the second embodiment, when viewed from above the piston.
Figure 15:
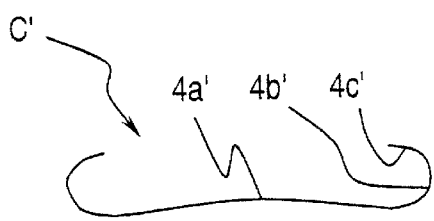
FIG. 15 is a diagrammatic transverse cross sectional view of the elliptically cavity as seen along section line 15—15 of FIG. 14 that is formed in the top surface of the piston of the direct fuel injection engine illustrated in FIG. 9 of the second embodiment.
Figure 16:
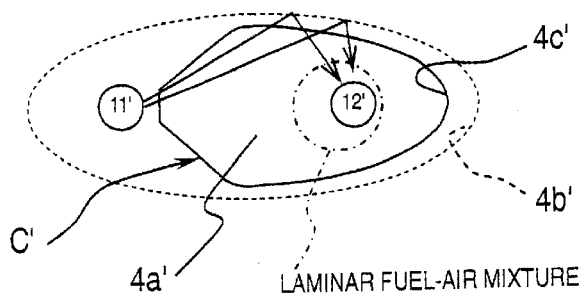
FIG. 16 is a schematic illustration showing the fuel streams from the fuel injection valve relative to the spark plug and the fuel injection valve for the elliptically shaped cavity formed in the top surface of the piston of the direct fuel injection engine illustrated in FIG. 9 of the second embodiment, when viewed from above the piston.

FIGS. 14–16 shows the shape of the piston cavity C' when viewed from above the combustion chamber 1. The cavity C' has the shape that incorporates a portion of an ellipse. As a result, the fuel streams, which spread out into a fan shape in a top view, gathers around the spark plug 12'.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-2453. The entire disclosure of Japanese Patent Application No. 2002-2453 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection engine comprising:
a combustion chamber having a piston movably mounted therein, the piston including an upper wall having a cavity with a fuel stream directing surface;
a spark plug having a spark discharge gap arranged to ignite a fuel-air mixture in the combustion chamber; and
a fuel injection valve including a front edge portion with a plurality of injection vents arranged and configured to directly inject fuel into the combustion chamber against the fuel stream directing surface as plurality of solid-core fuel streams that strike at non-perpendicular angles,
the fuel stream directing surface being at least partially curved to direct movement of the fuel streams after striking the fuel stream directing surface toward the fuel injection valve, and the fuel stream directing surface being partially elliptical in a top plan view with its focal points being located at the front edge portion of the fuel injection valve and at the spark discharge gap of the spark plug as its focal points.

2. The direct fuel injection engine as recited in claim 1, wherein
the injection vents have circularly shaped transverse cross sections with prescribed diameters that are configured to form each of the fuel streams as a circular cone shaped fuel stream with a small apex angle.

3. The direct fuel injection engine as recited in claim 1, wherein
the fuel stream directing surface includes a first wall surface and a second wall surface extending upwardly from the first wall surface and curving toward the fuel injection valve to direct movement of the fuel streams after striking the first wall surface toward the fuel injection valve, and the second wall surface being partially elliptical in a top plan view with its focal points being located at the front edge portion of the fuel injection valve and at the spark discharge gap of the spark plug as its focal points.

4. The direct fuel injection engine as recited in claim 3, wherein
the cavity further includes a third wall surface extending from the second wall surface, and being oriented toward a vicinity of the front edge of the fuel injection valve.

5. The direct fuel injection engine as recited in claim 3, wherein
the second wall surface has an end edge portion with a tangent oriented toward a vicinity of the front edge of the fuel injection valve.

6. The direct fuel injection engine as recited in claim 3, wherein
the injection vents have circularly shaped transverse cross sections with prescribed diameters that are configured to form each of the fuel streams as a circular cone shaped fuel stream with a small apex angle.

7. The direct fuel injection engine as recited in claim 6, wherein
the cavity further includes a third wall surface extending from the second wall surface, and being oriented toward a vicinity of the front edge of the fuel injection valve.

8. The direct fuel injection engine as recited in claim 7, wherein
the fuel injection valve is further configured to provide a fuel injection pressure of at least 20 MPa.

9. The direct fuel injection engine as recited in claim 8, wherein
the front edge portion of the fuel injection valve is located in a peripheral margin area of the piston, and
the injection vents are configured so that the fuel streams injected from the injection vents form a fan shape.

10. The direct fuel injection engine as recited in claim 3, wherein
the second wall surface has an end edge portion with a tangent oriented toward a vicinity of the front edge of the fuel injection valve.

11. The direct fuel injection engine as recited in claim 10, wherein the cavity further includes a third wall surface extending from the second wall surface, and being oriented toward a vicinity of the front edge of the fuel injection valve.

12. The direct fuel injection engine as recited in claims 11, wherein the fuel injection valve is further configured to provide a fuel injection pressure of at least 20 MPa.

13. The direct fuel injection engine as recited in claim 12, wherein the front edge portion of the fuel injection valve is located in a vicinity of a center axis of the piston, and the injection vents are configured so that the fuel streams injected from the injection vents form a hollow circular cone shape.

14. The direct fuel injection engine as recited in claim 1, wherein the fuel injection valve is further configured to provide a fuel injection pressure of at least 20 MPa.

15. The direct fuel injection engine as recited in claim 1, wherein the front edge portion of the fuel injection valve is located in a vicinity of a center axis of the piston, and the injection vents are configured so that the fuel streams injected from the injection vents form a hollow circular cone shape.

16. The direct fuel injection engine as recited in claim 1, wherein the front edge portion of the fuel injection valve is located in a peripheral margin area of the piston, and the injection vents are configured so that the fuel streams injected from the injection vents form a fan shape.

17. A direct fuel injection engine comprising:

means for forming a combustion chamber having a piston movably mounted therein, the piston including an upper wall having a cavity with a fuel stream directing surface;

means for igniting a fuel-air mixture in the combustion chamber; and means for directly injecting fuel into the combustion chamber against the fuel stream directing surface as a plurality of pole shaped fuel streams at non-perpendicular angles, the fuel stream directing surface being at least partially curved to direct movement of the fuel streams after striking the fuel stream directing surface toward the fuel injection valve, and the fuel stream directing surface being partially elliptical in a top plan view with its focal points being located at the means for directly injecting and at the means for igniting.

* * * * *